United States Patent [19]

Priaroggia et al.

[11] Patent Number: 4,744,935

[45] Date of Patent: * May 17, 1988

[54] PROCESS AND APPARATUS FOR MANUFACTURING A CABLE WITH HELICAL FILAMENTS EMBEDDED IN PLASTIC

[75] Inventors: Paolo G. Priaroggia; Feliciano Cecchi, both of Milan, Italy

[73] Assignee: Società Cavi Pirelli S.p.A., Milan, Italy

[*] Notice: The portion of the term of this patent subsequent to Jun. 16, 2004 has been disclaimed.

[21] Appl. No.: 911,914

[22] Filed: Sep. 22, 1986

[30] Foreign Application Priority Data

Sep. 27, 1985 [IT] Italy ............................ 22302 A/85

[51] Int. Cl.⁴ .............................................. B29C 47/02
[52] U.S. Cl. ..................................... 264/103; 264/1.5; 264/174; 425/113; 425/114; 425/321; 425/376 B
[58] Field of Search ............... 264/103, 174, 1.5; 425/113, 111, 114, 321, 112, 378 R, 463, 376 B, 391

[56] References Cited

U.S. PATENT DOCUMENTS

| | | | |
|---|---|---|---|
| 4,017,579 | 4/1977 | Roe et al. | 264/174 |
| 4,151,237 | 4/1979 | Ney | 264/40.7 |
| 4,155,963 | 5/1979 | de Vecchis et al. | 264/174 |
| 4,205,899 | 6/1980 | King et al. | 264/1.5 |
| 4,272,472 | 6/1981 | Hulin et al. | 264/174 |
| 4,409,154 | 10/1983 | Grenat | 425/463 |
| 4,474,426 | 10/1984 | Yataki | 264/1.5 |
| 4,528,148 | 7/1985 | Dotti | 264/1.5 |
| 4,541,970 | 9/1985 | Caverly et al. | 264/174 |
| 4,568,507 | 2/1986 | Baxter | 425/114 |
| 4,645,628 | 2/1987 | Gill | 264/174 |

FOREIGN PATENT DOCUMENTS

| | | | |
|---|---|---|---|
| 46-17733 | 5/1971 | Japan | 264/174 |
| 59-192205 | 10/1984 | Japan | 264/1.5 |

Primary Examiner—Jeffery Thurlow
Attorney, Agent, or Firm—Brooks Haidt Haffner & Delahunty

[57] ABSTRACT

Process and apparatus for making a cable with filiform elements, such as protected optical fibers or electrical conductors, in open-helix configuration and embedded in a polymeric material. The elements are fed through an extruder where the polymeric material in a plastic state is extruded thereover. The polymeric material with the elements therein is twisted in alternate directions around the cable axis as such material is advanced. The polymeric material is cooled downstream of the extruder to fix the elements in open-helix configuration. The polymeric material may be so twisted by alternately rotating a portion of the extruder in contact with the polymeric material in opposite directions or if the cable includes a central rope, by so twisting the rope in advance of the extruder with a pulley engaging the rope and rotated in a direction transverse to the plane of rotation of the pulley and around the axis of the rope.

9 Claims, 1 Drawing Sheet

ALTERNATING ROTATION MOTOR DRIVE

PROCESS AND APPARATUS FOR MANUFACTURING A CABLE WITH HELICAL FILAMENTS EMBEDDED IN PLASTIC

The present invention relates to a process and to a line for manufacturing optical fiber and/or electrical cables, of the type wherein the energy transmitting elements are completely embedded in the polymeric material of the cable and have an open helix configuration around the cable axis.

In particular, the process and the manufacturing line according to the invention have the object of manufacturing cables, the structure of which preferably comprises a traction-resistant rope, or the like, which occupies the radially innermost position and which is embedded in a polymeric body. Energy transmitting component parts, constituted by the filiform elements (to be defined hereinbelow) are also embedded in said body and are disposed, according to an open helix configuration, around the rope.

In this text, the term "filiform elements" is intended to mean both optical fibers which are protected by an adherent, or preferably, a loose type of protection, and electrical conductors.

Moreover, the term "open helix" is intended to mean that the said filiform elements are disposed around the axis of the cable, or around a rope which occupies the cable's radially innermost position, in alternate S-shaped or Z-shaped tracts of opposite hand.

A process and a manufacturing line for manufacturing the type of cables described above are already known. This known process employs the steps set forth hereinafter.

To begin with, a first polymeric layer is formed on the traction-resistant rope which constitutes the radially innermost part of the cable.

Filiform elements are then wound in an open helix configuration on the outer surface of the first polymeric layer and, at the same time, the elements are fixed in position by binding them, such as by means of wires, tapes or the like, on the outer surface of the first polymeric layer.

Thereafter, upon the assembly obtained through the previous step, there is extruded a second polymeric layer which adheres to the outer surface of the first layer (forming together with it the polymeric body of the cable), and which embeds the filiform elements on the first layer.

The known line for manufacturing such cables in question comprises, downstream of a bobbin from which the rope forming the radially innermost part of the cable is uncoiled, a first extruder which extrudes the first polymeric layer over the rope.

Downstream of the first extruder, there is a device which provides for the winding of the filiform elements, in an open-helix way, on the outer surface of the first polymeric layer.

There immediately follows a mechanism which carries out a binding of the open-helix winding of the filiform elements to the first layer, at points spaced along the cable axis, such as by means of coiling a wire, a steel ribbon or the like, as the winding is gradually formed.

Downstream of the mechanism which effectuates said binding, there is a second extruder which forms a second polymeric layer which covers the first layer (forming along with this, the polymeric body of the cable) and which embeds the open-helix windings of the filiform elements fixed to the first layer of the bindings.

In the known process and line, it is essential to bind the open-helix wound, filiform elements, to the first polymeric layer so as to allow for the extrusion of the second polymeric layer and so as to obviate, during this operation, alterations taking place in the correct open-helix configuration of the filiform elements.

In spite of the presence of the bindings, it was not possible to maintain a constant and precise spacing in-between the adjacent filiform elements during extrusion of the second layer.

Moreover, the bindings of the filiform elements, which are required only for the purpose of manufacturing the cable, involve introducing, into the cable, an element which serves no purpose for the functioning of the cable itself, and which, moreover, proves to be detrimental since the presence of the bindings gives rise to cavities being formed, in the polymeric material of the cable, which prevents the perfect and entire embedment of the filiform elements in the polymeric material.

One object of the present invention is to produce cables of the type described, wherein the filiform elements, which are embedded in the polymeric material of the cable and, in particular, in a polymeric layer which is extruded around a rope occupying the cable's radially innermost position, are correctly disposed according to open-helices and are equidistant one from each other without the presence of any bindings and thereby, making simpler the production lines for such cables.

In accordance with the object of the present invention, the process for manufacturing cables of the type with at least one filiform element having an open-helix configuration with respect to the cable's axis is embedded in the polymeric material of the cable comprises the steps of feeding an extrusion head with a polymeric material in plastic state, of inserting at least one filiform element into said extrusion head embedding the filiform elements in the polymeric material in plastic state as they pass through the extruder head, in such a way that said filiform elements have substantially their entire outer surfaces closely adhering to the polymeric material, submitting the plastic state polymeric material, while it advances along the cable axis, to an alternating rotary motion relative to said axis, while allowing said filiform elements to follow the movement of the polymeric material in which they are embedded so that, downstream of the extrusion head, the filiform elements have an open-helix configuration around the axis of the cable, and thereafter, stably fixing the open-helix configuration of the filiform elements by causing said polymeric material to set.

Another object of the present invention is a production or manufacturing line for cables of the type where at least one filiform element, having an open-helix configuration with respect to the axis of the cable, is embedded in the polymeric material of the cable, said line comprising an extrusion head provided with at least distinct inlet openings for the plastic state polymeric material and for at least one filiform element and a mechanism, associated with the extrusion head, which subjects the plastic state polymeric material, as it advances along the axis of the cable, to an alternating rotary motion with respect to the axis. The inlet opening for filiform elements in the extrusion head opens into the conduit of the extrusion head where the plastic state polymeric material flows, so that the filiform elements become entirely embedded within said polymeric material and are caused to follow an alternating rotary motion and thereby assume an open helix configuration with respect to the axis of the cable produced.

Other objects and advantages of the present invention will be apparent from the following detailed description of the presently preferred embodiments thereof, which description should be considered in conjunction with the accompanying drawings in which:

FIG. 1 schematically illustrates a cable production line according to the invention;

Figure 2:
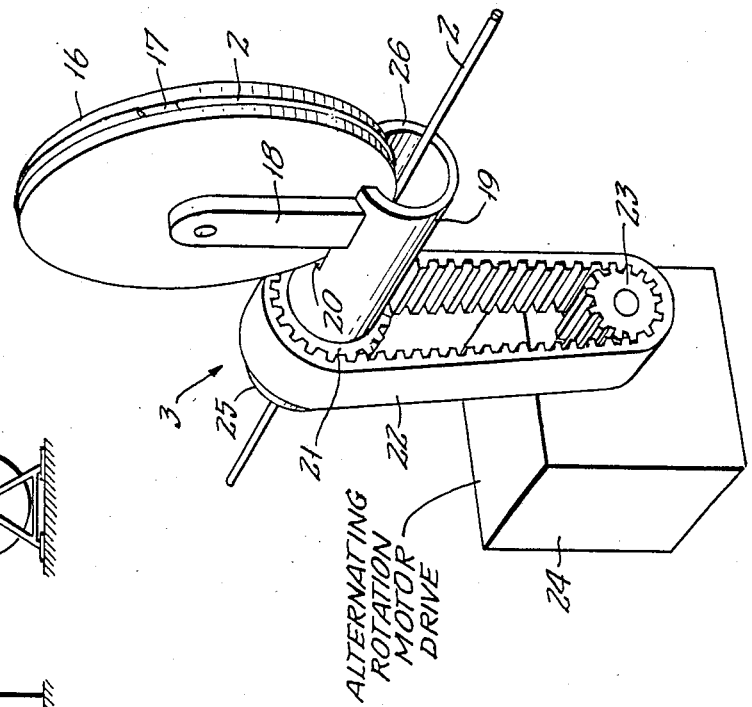
FIG. 2 is a perspective view of the means for rotating the traction-resistant rope of the cable, such means being part of the production line illustrated in FIG. 1.

The process of the invention for manufacturing optical fiber cables and/or electrical cables of the type previously described, comprises the steps which are set forth hereinafter.

An extrusion head, from which the cable exits, is fed with a polymeric material in plastic state and with a plurality of filiform elements, for example, a plurality of optical fibers having a loose type of protection, e.g. a tube of polymeric material having an inner diameter greater than the external diameter of the fiber.

As used herein, "polymeric material in plastic state" means a thermoplastic material which is heated to a plastic state, and such material is in a plastic state by the time that it reaches the extruder outlet. Such material is flowable under pressure in the plastic state, but will retain its form after leaving the extruder and until it is cooled. Examples of such materials and the temperature at which they are in the plastic state are as follows:

| Material | Plastic Temperature Range |
|---|---|
| low density polyethylene | 110–150° C. |
| medium density polyethylene | 120–160° C. |
| high density polyethylene | 130–170° C. |
| polypropylene | 150–190° C. |
| ethylene-vinyl-acetate copolymers | 90–150° C. |
| ethylene-ethylacrylate copolymers | 90–150° C. |
| plasticized PVC having a Shore A hardness comprised between 80 and 90 | 150–180° C. |

Specifically, the filiform elements are introduced into the extrusion head symmetrically, with respect to the axis of the head. Preferably, the extrusion head is also fed with a traction-resistant rope which will be covered with a plastic layer, such rope being, for example, a rope made of steel or of a material having a similar mechanical resistance, such as the aromatic polyamids, carbon fibers or the like.

The rope which is intended for forming the traction-resistant element of the cable core is inserted into the extrusion head at the axis of the head.

As the filiform elements and the rope are advanced, they are embedded, inside the extrusion head, into the polymeric material in such a way that both the elements and the rope have their entire surfaces contacting the polymeric material and the filiform elements surround the rope in spaced relation thereto.

While the filiform elements, the rope, and the polymeric material in plastic state in which the elements and the rope are embedded, advance into the extrusion head and issue forth from it, the polymeric material is subjected to an alternating rotary motion with respect to the axis of the cable while permitting said filiform elements to follow the movement of the polymeric material in which they are embedded. As a result, the filiform elements follow the alternating rotary motion during their advancement.

Due to the effect of the advancing movement and of the alternating rotary motion to which the filiform elements are subjected by the polymeric material in which they are embedded, the filiform elements have an open-helix configuration in the polymeric material of the cable downstream of the extrusion head.

Downstream of the extrusion head, the open-helix configuration imparted to the filiform elements is fixed by means of converting the polymeric material in which they are embedded from the plastic state to a form in which it retains its shape at normal temperature, which is carried out by cooling the polymeric material and preferably, the polymeric material is cooled by a rapid and immediate quenching.

The steps of the process of the invention in which the polymeric material in plastic state is subjected to, an alternating rotary motion as it is advancing towards the axis of the cable which is being produced, can be effectuated in various ways.

In one embodiment of the process, the alternating rotary motion of the polymeric material in plastic state, is obtained by subjecting the extrusion head inside which the polymeric material passes to an alternating rotary motion relative to the axis of the cable being produced. This embodiment of the process also allows for manufacturing cables of the type to which the invention relates without a traction-resistant rope in the radially innermost zone of such cables.

In another embodiment of the process, the alternating rotary motion of the polymeric material in plastic state is obtained by imposing an alternating torsion to the rope which is embedded in the polymeric material and which occupies the radially innermost zone of the cable.

Although two specific embodiments have been described, it will be apparent to those skilled in the art that there are other ways for causing the polymeric material in plastic state which passes through the extrusion head, and/or, close to its outlet opening, to an alternating rotary motion relative to the axis of the cable being produced.

The process according to the invention, is carried out with a line that also forms the object of the present invention. The main elements forming a production line, according to the present invention, are:

(1) An extrusion head with inlet openings for the filiform elements, the purpose of which is to supply the filiform elements into the conduit of the extrusion head wherein the plastic polymeric material flows in its plastic state. When required, the extrusion head is also provided with an inlet opening for allowing the entry of a rope which is to be covered with a layer of plastic material and which will occupy the radially innermost zone of the cable when such rope is to be included in the cable.

(2) A mechanism, connected to the extrusion head when the cable is without a rope or in advance of the extrusion head of the cable includes a rope which is capable of subjecting the polymeric material in plastic state in which the filiform elements are embedded as the polymeric material advances in the direction of the cable axis, to an alternating rotary motion with respect to said axis and which causes the dragging of the said filiform elements embedded in said polymeric material into open-helix configuration due to such motion.

Figure 1:
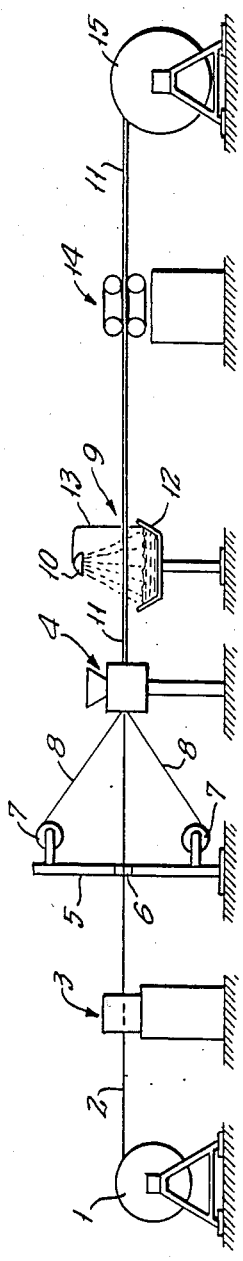

In FIG. 1, there is schematically shown one embodiment of a line, according to the invention, for manufacturing a cable incorporating a traction-resistant rope in the radially innermost zone.

The line shown in FIG. 1 comprises a bobbin or reel 1 on which a rope 2 is collected. Downstream of bobbin 1, in the advancing direction of the rope 2, there is a mechanism 3 (to be described hereinafter) which permits the rope 2 to advance freely towards the extrusion head 4 but which subjects the rope 2, while it moves through the extrusion head, to an alternating torsion. Said mechanism 3, is a previously mentioned mechanism which causes an alternating rotary motion of the polymeric material in plastic state during its advancement along the cable's axis.

Between the extrusion head 4, the characteristics of which will be described hereinafter, and the mechanism 3, there is interposed a support 5, or a similar element, provided with an opening 6 through which the rope 2 passes. A plurality of reels 7, mounted on the support 5, store the filiform elements 8 which are to be delivered to the extrusion head 4.

For example, the filiform elements are optical fibers provided with a loose type of protection, such as by plastic tubes in which at least one optical fiber is loosely housed. Alternatively, the filiform elements can be electrical conductors.

Each reel 7, borne by the support 5, can freely rotate around its own axis which is in a fixed position with respect to the support 5. The filiform elements 8, at the tract thereof, between the support 5 and the extrusion head 4, are subjected only to an advancing movement toward the extrusion head 4.

Downstream of the extrusion head 4, there is a cooling device 9 comprising at least one nozzle 10 which continuously sends a shower of cooling liquid, for example, water, over the cable 11 just as it emerges from the extrusion head 4 and comprising a tank 12 for collecting the cooling liquid.

A tube 13 connected to a pump (not shown) draws cooling water from tank 12 and sends said cooling water continuously into the nozzle 10.

Downstream of the cooling device 9, there is disposed a pulling device 14 of a per se known type, for example, a pulling device which comprises two endless, tracked gripping devices which engage the cable 11 and cause it to advance towards the collecting bobbin 15.

As was previously stated, in the line shown in FIG. 1, there is present a mechanism 3 which subjects the rope 2 to an alternating torsion while it moves through the extrusion head 4.

Figure 3:
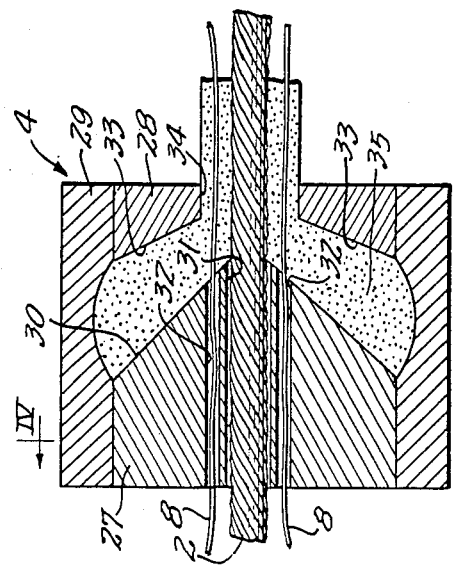
FIG. 3 is a longitudinal section of the extruder head forming part of the line shown in FIG. 1.

A particular embodiment for the mechanism 3 is shown in FIG. 2 and is also shown in FIG. 3 of copending U.S. patent application Ser. No. 808,442, filed Dec. 12, 1985, entitled "Process and Apparatus for Manufacturing a Core Provided with Open Helical Grooves for Receiving Optical Fibers", issued as U.S. Pat. No. 4,673,540 and assigned to the assignee of the present application. As can be seen in FIG. 2, the mechanism comprises a pulley 16 provided with a groove 17 which pulley 16 is free to rotate on its own axis and with respect to a bracket 18 extending radially from a hollow shaft or quill 19. This latter is provided with an aperture 20 which allows the pulley 16 to penetrate into the bore of the quill 19 in such a way that the pulley is tangent to the axis of the quill 19.

A toothed pulley 21, is secured to the quill 19. A toothed belt 22 engages the toothed pulley 21 and with another toothed pulley 23 connected to a motor 24 of the type capable of subjecting the toothed pulley 23 to an alternating rotary motion and hence, through the belt 22 and the toothed pulley 21 causing an alternating rotary motion of the quill 19.

The rope 2 engages the pulley 16, penetrating into the cavity 20 of the quill 19, after it enters the extremity 25 of the quill 19, winds around the pulley 16 and is lodged in the groove 17. The rope 2 exits from the quill 19 at the extremity 26 and travels to and passes through the extrusion head 4. The functioning of the mechanism 3 will be described hereinafter when describing the functioning of the line.

In an alternative embodiment (not shown in the drawing), the mechanism 3 comprises a continuous pulling device of the type illustrated in FIG. 2 of said U.S. Pat. No. 4,673,540. Such continuous pulling device is provided with endless, tracked gripping devices (inside which the rope 2 passes) mounted on a frame to which a motor is connected and which subjects the frame to an alternating rotary motion.

Figure 4:
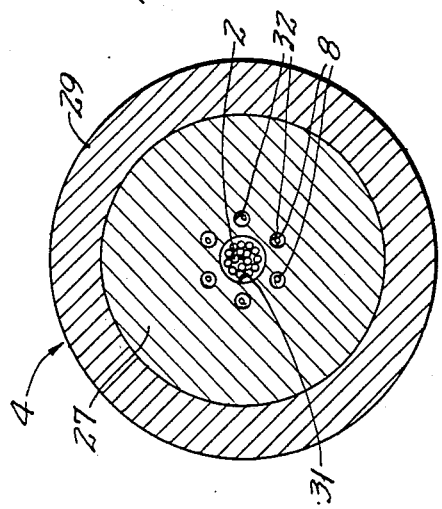
FIG. 4 is a transverse section of the extruder head shown in FIG. 3 and is taken along the line IV—IV in FIG. 3.

As stated previously, on leaving the mechanism 3, the rope 2 penetrates and passes through the extrusion head 4, the cross-section of which is shown in enlarged scale in FIGS. 3 and 4.

The extrusion head 4 comprises a first cylindrical body 27 coaxial with a second cylindrical body 28, both of which are enclosed in a cylindrical shell 29. The first cylindrical body 27 has a base 30 of a conical shape, and it is provided, at its axis, with an opening 31 for allowing the rope 2 to pass through the extrusion head 4.

A plurality of through-openings 32, symmetrically disposed around the through-opening 31 and parallel to it, are provided in the first cylindrical body 27 for allowing the entry of the filiform elements 8, into the extrusion head 4.

The second cylindrical body 28 has a funnel-shaped base 33 and inside it, an outlet opening 34 for the cable to exit, after it has been produced, from the extrusion head 4.

Between the bases 30 and 33 of the cylindrical bodies 27 and 28 and the inner surface of the cylindrical shell 29, there is a conduit 35 for the passage into the extrusion head of the polymeric material in plastic state which comes from an extruder (not shown) and that flows toward the outlet opening 34 of the extrusion head 4.

The through-openings 32, by means of which the filiform elements 8 enter into the conduit 35 for being embedded in the polymeric material, open into the conduit 35. Preferably, the axes of the through-openings 32 are parallel to the axis of the cable which is produced, and these axes of the through-openings 32 lie on a circle having a diameter which does not exceed the diameter of the outlet opening 34 of the extrusion head 4.

The functioning of the line shown in FIG. 1, is as follows:

The pulling device 14, engaged with the already produced part of the cable 11, exercises a continuous pull upon the cable 11 and sends the cable to the collecting bobbin 15. The cable 11 and its component elements, which are present upstream of the pulling device 14 are, through the action of this latter, also caused to advance in a continuous manner. As a consequence, the rope 2 and the plurality of filiform elements 8 are unrolled from the bobbin 1 and from the reels 7 and advance towards the extrusion head 4 and then, pass through it.

Prior to reaching the extrusion head 4, said rope 2 is forced to pass into the mechanism 3 where it is subjected to an alternating torsion even though it is allowed to advance freely.

The manner in which the mechanism 3 subjects the rope 2 to the alternated torsion is as follows:

In passing into the mechanism 3, the rope 2 is disposed at the axis of the hollow shaft or quill 19 except for the tract thereof which is wound around the pulley 16 and which adheres to the base of the pulley groove 17.

The alternating rotation, imparted to the quill 19 by motor 24, by means of the toothed pulleys 23 and 21 which are connected by the belt 22, forces the pulley 16, on which the rope 2 winds, to rotate in an alternating way with respect to the axis of said hollow shaft 19 along which the rope 2 passes. Therefore, the rope 2 is subjected to an alternating torsion even though it is free to slide within the hollow shaft 19 because the pulley 16, which engages the rope 2, is free to rotate around the bracket 18 which supports it.

While the rope 2 passes through the opening 31 in the extrusion head 4, it is subjected to the alternating torsion which is imparted to it by the mechanism 3, and it also becomes embedded in the polymeric material in plastic state which is introduced into the extrusion head 4 by an extruder (not shown in the drawing).

By way of the through-openings 32, the filiform elements 8 also enter into the extrusion head 4, and are completely embedded in the polymeric material in plastic state.

In the extrusion head 4, while the filiform elements 8, the rope 2, and the polymeric material which surrounds them all advance and issue forth from the outlet opening 34, the alternating torsion on the rope 2, the external surface of which contacts the polymeric material, drags the latter into an alternating rotary motion relative to the axis of the cable.

In fact, the irregularities which exist on the outer surface of rope 2 due to the presence of the component wires, or else, if the rope is clad with plastic, due to the friction existing between the plastic cladding and the polymeric material, drag the thin layer of this latter, which is in close contact with the rope, during the movement of the outer surface of the rope 2, such movement being an alternating rotary movement.

The high viscosity of the polymeric material in plastic state causes the alternating rotary motion, caused by contact with the rope, to be transmitted to the mass of polymeric material including at least that portion of the latter wherein the said filiform elements 8 are embedded. Hence, these elements 8 are dragged by the polymeric material in which they are embedded into an alternating rotary motion around the axis of the cable, and this action causes these filiform elements 8 to assume an open-helix configuration around the cable axis and hence, around the rope 2 which occupies the radially innermost position of the cable 11.

The cooling device 9, which is downstream of the extrusion head 4 and which causes the setting of the polymeric material, stably fixes therein the filiform elements 8 therein in the open-helix configuration imparted to them at the extrusion head.

As one specific example of the process of the invention, the polymeric material used is a medium density polyethylene having a specific weight of 0.93 gr/cm$^3$, a melt flow index (which is an index of the polymer molecular weight), established according to the ASTMD1230 standards entitled "Test for Flow Rates of the Thermoplastic Extrusion Plastomers", of 0.2 gr/min and a melting point temperature of 125° C.

The extrusion temperature is 150° C. and the extrusion speed (equal to the advancing speed of the produced cable) is of 5 m/min. The extruder used has a diameter of 120 mm and a screw with a ratio between its length and diameter of 20 mm, and said screw is under rotation speed of 25 rev/min.

The rope disposed to occupy the radially innermost zone of the produced cable has a diameter of 10 mm and is formed by 19 steel wires of 2 mm of diameter laid-up together. The rope is covered with a layer of the above polymeric material having 5 mm of thickness and embedding 6 loose type optical fibers arranged equally spaced on a circumference of 15 mm diameter.

The rope when passing into the extruder is subjected to an alternating torsion, given to it upstream of the extruder, by imposing on the rope alternating rotations of 360° around its axis with a frequency of 2.5 rotations per minute which cause an open helix arrangement of the optical fibers within the polymeric material of the cable produced with pitch of 20 cm.

The temperature of the cooling water is of 27° C. (since the water is continuously recirculated in the device 9), and the cable length on which the cooling is applied is 30 meters. Downstream of the cooling device, the cable temperature is 35° C.

Figure 5:
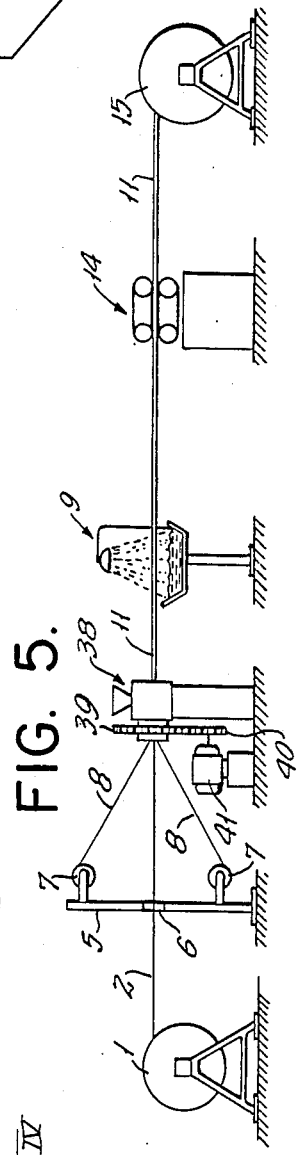
FIG. 5 schematically illustrates an alternative embodiment of a cable manufacturing line according to the invention.

In FIG. 5, there is schematically shown an alternative embodiment for a production line, according to the present invention, which differs from the one shown in FIG. 1 which includes for a mechanism in advance of the extrusion head for twisting the filiform elements into an open-helix configuration by applying alternating torsion to a rope forming part of the cable.

As can be seen in FIG. 5, the production line comprises a bobbin 1 on which a rope 2 is wound, said rope being destined to occupy the radially innermost portion of the cable 11 to be produced. Downstream of the bobbin 1, there is an extrusion head 38 having an identical structure to the one shown in FIGS. 3 and 4, except that it is provided with a toothed gear 39 secured to the outer surface of the extrusion head 38. As an alternative, the toothed gear 39 can be secured to a component of the extrusion head 38, for example, to the first cylindrical body 27 which, in this embodiment, is rotatable with respect to the second cylindrical body 28 and to the shell 29 which are the other component parts of the extrusion head 38. The gear 39 is coupled with a gear 40 rotatable by the shaft of a motor 41, such motor 41 being of the type which alternately rotates its shaft and the toothed wheel 40 in opposite directions and hence, causes alternating rotation of the extrusion head 38 or, in the alternative embodiment, only the cylindrical body 27.

In the production line shown in FIG. 5, the components which include the motor 41, the gear 40 and the gear 39, constitute the mechanism for causing (as will be explained later), the alternating rotary motion to the polymeric material in plastic state, in which the filiform elements are embedded.

Between the extrusion head 38 and the bobbin 1, there is interposed a support 5, or the like, provided with an opening 6 through which the rope 2 passes, which carries a plurality of reels 7 on which are stored the filiform elements 8 which are to be delivered to the extrusion head 38.

Downstream of the extrusion head 38, proceeding in the advancing direction of the cable 11, there is encountered in succession:

(a) A cooling device 9 identical to the one identified with the reference numeral 9 in FIG. 1;

(b) A pulling device 14 identical to the one identified with the reference numeral 14, in FIG. 1; and (c) A bobbin 15 for collecting the produced cable 11.

The functioning of the line shown in FIG. 5, is as follows:

The pulling device 14, which engages the part of the already produced cable 11, pulls the cable 11 causing it to advance in the direction of the collecting bobbin 15. The cable 11 and its component elements which are present upstream of the pulling device 14 are also caused to advance through the action of this latter.

It results from this that rope 2 and the filiform elements 8, advance towards and enter the extrusion head 38 whereby they become embedded in the polymeric material in plastic state which flows towards the outlet opening of the extrusion head 38.

However, the extrusion head 38 is subjected to an alternating rotary motion around its own axis, which coincides with the axis of the cable 11 which is produced by the motor 41 by means of the gear 40 and the gear 39.

Owing to the effect of the alternating rotary motion of the extrusion head 38, the polymeric material which passes through it is subjected as well, to an alternating rotary motion relative to the axis of the cable which causes the filiform elements 8 which are embedded in the polymeric material to be twisted into an open-helix configuration.

In fact, since the extrusion head 38 is subjected to an alternating rotary motion relative to the axis of the cable, all the polymeric material passing through it is also subjected to said motion and the filiform elements 8 faithfully follow said motion because they are dragged into such motion by the polymeric material in which they are embedded.

In the alternative embodiment in which, just one component part of the extrusion head 38, such as the first cylindrical body 27, is subjected to an alternating rotary motion, the polymeric material which passes through the extrusion head 38 is subjected to a similar motion due to the friction existing between said polymeric material and said component part of the extrusion head 38 which is subjected to an alternating rotary motion.

Due to the fact that the rope 2 is impeded with respect to rotation around its own axis, because of the pulling device 14 and by the bobbin 1, the rope 2, which passes through the extrusion head 38 along the through-opening at the axis of the extrusion head which coincides with the axis of the produced cable 11, advances with practically only a rectilinear motion.

Therefore, downstream of extrusion head 38, the filiform elements 8 are disposed according to an open-helix configuration, around the axis of cable 11 and hence, around the rope 2 which occupies the radially innermost portion of said cable 11.

The cooling of the polymeric material, effectuated by the cooling device 9, which sets the polymeric material, makes the open-helix configuration which is imparted to the filiform elements both fixed and stable.

The production lines according to the invention which are shown in FIGS. 1 and 5, differ one from the other because of the specific mechanism adopted for subjecting the polymeric material in plastic state which transits through the extrusion head and/or near the outlet opening to an alternating rotary motion relative to the cable axis.

Both the lines that are shown and described hereinabove serve for producing cables that are provided with a rope, or some such similar traction-resistant element, which occupies the radially innermost position therein.

For producing cables which do not have a traction-resistant rope, the bobbin 1 and the through-openings for the passagae of the rope in the extrusion head may be omitted and the pulling device 14 exerts on the produced cable only a feeding action of the same towards the collecting bobbin 15 thereby avoiding, in an absolute manner, subjecting the cable to even minimum tractional stresses. For this purpose, it is preferable to include in this production line a device of the per se known type which adjusts the action of the pulling device 14 as a function of the speed of extrusion of the polymeric material from the extrusion head.

Although it is preferred to supply the polymeric material to the extruder, 4 or 38 in plastic state, it will be apparent that the polymeric material can be caused to reach the plastic state within the extruder by suitable heating of the extruder.

From the description given previously and from the following considerations, it can be understood that, with the process and the production lines of the invention, the stated objects are attained.

With the process and the lines of the invention, the open-helix configuration, around the cable axis, of the filiform elements embedded in the polymeric material, is obtained by simply subjecting said polymeric material in its plastic state inside the extrusion head, and/or near its outlet opening, to an alternating rotary motion, relative to the axis of the cable, in such a way that the filiform elements follow said motion of the polymeric material.

The alternating rotary motion, relative to the cable axis, which is so imposed on these filiform elements is a symmetrical motion with respect to said axis, and this permits obtaining a correct "open-helix" conformation of the filiform elements. Furthermore, it also assures that adjacent filiform elements are equidistant from one another.

The consolidation or setting, through cooling, of the polymeric material which, due to the symmetrical form it has in the produced cable, takes place in a radially uniform manner, permits effecting stable fixing of the open-helix configuration of the filiform elements without causing any alterations in their configuration. In this way, there is eliminated the presence of any binding around the filiform elements which, prior to the invention, was considered to be indispensable for obtaining the type of cable in question.

Moreover, the process and the production lines to the invention render the manufacturing of the cables simpler and cheaper.

In fact, whereas with the known process and production line, the polymeric material of the cable must be formed by extruding two successive superimposed layers with the interpositioning of the operations of winding the filiform elements in an open-helical configuration and of binding them to the first-formed layer of polymeric material, the process and the lines of the invention require only a single extruding operation. During such single extruding operation, the filiform elements are given the open-helix configuration needed with the elimination of the need of bindings which represent an element which is useless for the purpose of the cable function and which, moreover, are harmful because the presence of these bindings causes cavities to be formed in the polymeric material of the cable with a consequent imperfect embedding of the filiform elements inside said polymeric material.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A process for manufacturing cables in which at least one filiform element having an open-helix configuration is embedded in a polymeric material with the filiform element radially spaced from the longitudinal axis of the cable, said process comprising:
   feeding at least one non-helical, filiform element through an extruder;
   while said filiform element is passing through said extruder, extruding a polymeric material in a plastic state on and around said filiform element so as to surround and contact said filiform element by said polymeric material;
   while said filiform element surrounded and contacted by said polymeric material is advanced in the direction of feed of said filiform element, causing alternating rotary movement of said polymeric material, while it is still in the plastic state and with said filiform element therein, around an axis extending in the direction of feed of said filiform element and radially spaced from the axis of said filiform element to cause said filiform element to be forced by said polymeric material to follow the rotary movement of said plastic material to thereby cause alternating movement of said filiform element around said axis spaced from axis of said filiform element; and
   causing said polymeric material to set downstream of said extruder and thereby fix said filiform element in open-helix configuration;
   whereby with a single extrusion step a cable with a filiform element of open helix configuration surrounded by set polymeric material and spaced radially from the cable axis is obtained by reason of the alternating rotary movement of the polymeric material in a plastic state which engages the surface of the filiform element.

2. A process as set forth in claim 1 wherein said polymeric material is caused to rotate in alternately opposite directions around said axis by rotating a portion of said extruder in opposite directions around said axis.

3. A process as set forth in claim 1 wherein a rope is also fed through said extruder with said filiform element adjacent to said rope and spaced from the longitudinal axis of said rope and said polymeric material is also extruded around said rope and wherein said rope is rotated in alternately opposite directions around its axis in advance of the point where said polymeric material is extruded on and around said filiform element thereby causing alternating rotary movement of said polymeric material around the last-mentioned said axis.

4. A process as set forth in claim 1 wherein said polymeric material is caused to set by cooling said polymeric material.

5. Apparatus for producing a cable having at least one filiform element with an open-helix configuration embedded in a polymeric material and spaced from the axis of said cable, said apparatus comprising:
   an extruder with a conduit for receiving said polymeric material in a plastic state and an outlet for the passage of said filiform element with said polymeric material surrounding and contacting the surface of said filiform element, said outlet having an entrance side at said conduit and an exit side spaced from said entrance side in the direction away from said conduit and having a size greater than the diameter of said filiform element;
   said extruder having a channel extending from externally of said extruder to the side of said conduit opposite from said entrance side of said outlet and said channel having an opening at said conduit which is of a cross-sectional size smaller than said size of said opening and the axis of which is displaced to one side of the axis of said outlet for directing the passage of said filiform element into said conduit and for confining the passage of said filiform element through said conduit and said outlet to a path radially spaced from said axis of said outlet; and
   rotatable means in advance of said exit side of said outlet for alternately rotating said polymeric material in the plastic state in opposite directions around said axis of said outlet;
   whereby the filiform element passes through said outlet in a position spaced from the axis of said outlet, the plastic polymeric material passes through said outlet and surrounds and contacts the filiform element and the rotatable means by reason of the alternate rotation of the plastic polymeric material causes the filiform element to asssume an open helix configuration.

6. Apparatus as set forth in claim 5 wherein said extruder has a plurality of channels extending from externally of said extruder to said side of said conduit opposite from said entrance side of said outlet, said channels being displaced from and extending substantially parallel to said axis of said outlet and said channels being spaced from each other and lying on a circle with a diameter at least as small as the diameter of said outlet.

7. Apparatus as set forth in claim 5 further comprising polymeric material cooling means disposed downstream of said extruder.

8. Apparatus as set forth in claim 5 wherein said rotatable means is a portion of said extruder which contacts said polymeric material as it is extruded around said filiform element and drive means which is connected to said portion of said extruder and which is alternately rotatable in opposite directions.

9. Apparatus as set forth in claim 5 wherein said extruder has a further channel extending from externally of said extruder to said side of said conduit opposite from said entrance side of said outlet and extending substantially coaxial with said axis of said outlet for the passage of a rope through said extruder and into said conduit and wherein said rotatable means is means disposed in advance of said extruder for engaging and alternately rotating said rope in opposite directions around its axis.

* * * * *